United States Patent
Yumoto et al.

(10) Patent No.: US 8,095,681 B2
(45) Date of Patent: Jan. 10, 2012

(54) LOAD BALANCING SERVER AND SYSTEM

(75) Inventors: Kazuma Yumoto, Fuchu (JP); Eri Kawai, Yokohama (JP); Masahiro Yoshizawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 916 days.

(21) Appl. No.: 11/328,172

(22) Filed: Jan. 10, 2006

(65) Prior Publication Data

US 2006/0242300 A1    Oct. 26, 2006

(30) Foreign Application Priority Data

Apr. 25, 2005 (JP) ................................ 2005-125850

(51) Int. Cl.
*G06F 15/16* (2006.01)
*G06F 15/173* (2006.01)
*G06F 9/46* (2006.01)
*H04L 12/26* (2006.01)

(52) U.S. Cl. ........ 709/232; 370/230; 709/206; 709/224; 709/225; 709/227; 709/238; 718/105

(58) Field of Classification Search .......... 709/204–207, 709/223–235, 238–244; 370/230; 718/705
See application file for complete search history.

(56) References Cited

U.S. PATENT DOCUMENTS

| | | | | |
|---|---|---|---|---|
| 5,938,732 A * | 8/1999 | Lim et al. | ...................... | 709/229 |
| 6,327,622 B1 * | 12/2001 | Jindal et al. | .................... | 709/228 |
| 6,389,448 B1 * | 5/2002 | Primak et al. | .................. | 718/105 |
| 2001/0049741 A1 * | 12/2001 | Skene et al. | ..................... | 709/232 |
| 2001/0056416 A1 * | 12/2001 | Garcia-Luna-Aceves | ........ | 707/2 |
| 2002/0078203 A1 * | 6/2002 | Greschler et al. | ............. | 709/225 |
| 2002/0083199 A1 * | 6/2002 | Dingsor et al. | ............... | 709/245 |
| 2002/0103846 A1 * | 8/2002 | Zisapel et al. | ................ | 709/105 |
| 2003/0174648 A1 * | 9/2003 | Wang et al. | .................... | 370/235 |
| 2004/0088424 A1 * | 5/2004 | Park et al. | ..................... | 709/229 |

FOREIGN PATENT DOCUMENTS

JP    2002-334012    5/2001

OTHER PUBLICATIONS

Rosenberg, J. et al., "SIP: Session Initiation Protocol", Network Working Group, (Jun. 2002), pp. 1-269.

* cited by examiner

*Primary Examiner* — Ashok Patel
*Assistant Examiner* — Kevin Bechtel
(74) *Attorney, Agent, or Firm* — Stites & Harbison PLLC; Juan Carlos A. Marquez, Esq.

(57) ABSTRACT

When load balancing (LB) for SIP message communication is performed across multiple SIP servers, the number of messages that must be processed by an LB server is reduced. The SIP LB server includes an LB management means which, if the previous hop source of a received request message is a terminal in the local domain, determines which SIP server to serve the terminal, and a redirect function which notifies the message source terminal in the local domain of the address of the serving SIP server. The SIP LB server further includes an LB management table which, if the previous hop source of a received request message is other than a terminal in the local domain, is searched to find a SIP server serving communication with a destination terminal in the local domain, and a stateless forwarding function which statelessly forwards the received request message to the resolved SIP server address.

5 Claims, 15 Drawing Sheets

```
REGISTER sip:domainA.co.jp SIP/2.0                              ← 50
Via: SIP/2.0/UDP client.domainA.co.jp:5060;branch=z9hG4bKnashds7
Max-Forwards: 70
From: Bob <sips:bob@domainA.co.jp>;tag=a73kszlfl  ⎫
To: Bob <sips:bob@domainA.co.jp>                  ⎬  ← 52
Call-ID: 1j9FpLxk3uxtm8tn@domainA.co.jp
CSeq: 1 REGISTER
Contact: <sips:bob@client.domainA.co.jp>          ← 53
Content-Length: 0
```

```
SIP/2.0 302 Moved Temporarily
Via: SIP/2.0/UDP client.domainA.co.jp:5060;branch=z9hG4bKnashd92
;received=192.0.2.201
From: Bob <sips:bob@domainA.co.jp>;tag=ja743ks76zlflH
To: Bob <sips:bob@domainA.co.jp>;tag=37GkEhwl6
Call-ID: 1j9FpLxk3uxtm8tn@domainA.co.jp
CSeq: 1 REGISTER
Contact: <sip:192.0.2.110>;expires=3600            ← 54
Content-Length: 0
```

```
REGISTER sip:192.0.2.11 SIP/2.0                                    ← 56
Via: SIP/2.0/UDP client.domainA.co.jp:5060;branch=z9hG4bKnashds7
Max-Forwards: 70
From: Bob <sips:bob@domainA.co.jp>;tag=a73kszlfl  ⎫
To: Bob <sips:bob@domainA.co.jp>                  ⎬  ← 58
Call-ID: 1j9FpLxk3uxtm8tn@domainA.co.jp
CSeq: 2 REGISTER
Security-Client: tls
Security-Client: digest
Require: sec-agree
Proxy-Require: sec-agree
Contact: <sips:bob@client.domainA.co.jp>                           ← 59
Content-Length: 0
```

FIG.7

| SIP SERVER / SIP-URI | P1 | P2 | P3 | ... | P10 | ... |
|---|---|---|---|---|---|---|
| bob@domainA.co.jp | 1 | | | | | |
| alice@domainA.co.jp | | | 1 | | | |
| ⋮ | | | | | | |
| TOTAL | 150 | | 180 | | 125 | |

| SIP SERVER / SIP-URI | P1 (ASSIGNMENT STATE) | | P2 (ASSIGNMENT STATE) | | P3 | | ... |
|---|---|---|---|---|---|---|---|
| | | TIME TO LIVE | | TIME TO LIVE | | TIME TO LIVE | |
| bob@domainA.co.jp | 1 | T1 | | | | | |
| alice@domainA.co.jp | | | 1 | T2 | | | |
| ⋮ | | | | | | | |
| TOTAL | 150 | | 180 | | 125 | | |

LOAD BALANCING SERVER AND SYSTEM

CLAIM OF PRIORITY

The present application claims priority from Japanese application JP 2005-125850 filed on Apr. 25, 2005, the content of which is hereby incorporated by reference into this application.

FIELD OF THE INVENTION

The present invention relates to a technique in which a server that performs session control and management determines a destination to which a received message should be forwarded and, in particular, to a technique for processing communication traffic by distributing loads across multiple session control servers.

BACKGROUND OF THE INVENTION

Load balancing servers have heretofore been evolved for the purpose of handling huge traffic by sharing traffic which would otherwise have to be handled by a Web server across multiple Web servers having equivalent functions. Load balancing is now being developed, extending its scope to cover a variety of devices and protocols involving routers, mail servers, VPN gateways, etc., besides Web servers.

Among these network elements, a server that realizes load balancing across SIP servers is included. Taking account of specifications specific to a Session Initiation Protocol (SIP) (see RFC 3261), this load balancing server is provided with a function of allocating traffic of a persistent dialog to one server. A typical method that is used to implement the function of allocating traffic of a persistent dialog to one server (persistence function) is to refer to a CALL-ID value included in a SIP header and allocate messages having the same CALL-ID value to one server.

There also exists a load balancing server for traffic of encrypted communication such as the one that supports Hypertext Transfer Protocol Security (HTTPS) encrypted communication using a Secure Socket Layer (SSL). As a method for realizing a load balancing server, there exists a method in which the load balancing server notifies a terminal of the address of an assigned server and instructs the terminal to reconnect to the assigned server specified by the load balancing server (e.g., see JP-A No. 334012/2002).

SUMMARY OF THE INVENTION

When a prior-art load balancing server determines which server should be assigned, referring to information included in the payload of an IP packet (e.g., layer 7 information and application layer information in a SIP message), it is needed to terminate encrypted communication once at the load balancing server and decrypt the communication. A first challenge and object of the present invention is to prevent an increase in the processing load of the load balancing server due to this decryption task, which results in a reduced effect of load balancing and forwarding delay.

For prior-art load balancing servers using redirect notification, no consideration is taken for things after a step of notifying a terminal of the assigned server. In some case, the terminal might permanently continue to connect to the assigned server thus notified. A second challenge and object of the present invention is to prevent long concentration of processing load on a particular server assigned, which results in a reduced effect of load balancing.

For prior-art load balancing servers using redirect notification, it is assumed that a connection or communication processing request is issued from a terminal having a function of redirection by redirect notification. It is impossible to handle a request from a server or the like without the function of redirection by redirect notification (e.g., an ordinary SIP proxy server). A third challenge and object of the present invention is to treat a connection or communication processing request from a server without the function of redirection by redirect notification.

For a prior-art load balancing server, during a continuous connection established between a terminal and a server assigned by the load balancing server, when another terminal or server issues a request to connect to the terminal, this request may be assigned to a server different from the assigned server being continuously connected with the terminal. A fourth challenge and object of the present invention is to prevent consumption of the resources of multiple servers assigned for serving a single terminal.

For a prior-art load balancing server, if a terminal or server directly transmits a connection request to one of servers assigned without transmitting it to the load balancing server, the load balancing server is unable to detect this connection request, which may result in that loads are not distributed well as instructed by the load balancing server. A fifth challenge and object of the present invention is to prevent connection to server resources other than a server assigned by the load balancing server.

As means of solution to the first challenge, a load balancing server of the present invention determines whether the previous hop source at a higher layer of a received IP packet is a terminal, if so, determines which server should be assigned to serve the terminal, and notifies the terminal of the address of the assigned server (redirect). Then, the terminal retransmits the IP packet to the assigned server thus notified by redirect.

As means of solution to the second challenge, in the present invention, time to live is set for a period during which a server is assigned to serve a terminal. When the time to live expires, the connection of the terminal to that server is rejected.

As means of solution to the third challenge, the load balancing server of the present invention determines whether the previous hop source at a higher layer of a received IP packet is a server and, if so, transmits the IP packet to a server assigned to serve a terminal that is the destination of the IP packet.

As means of solution to the fourth challenge, during a continuous connection established between a terminal and an assigned server, when another terminal or server issues a request to connect to the terminal, the load balancing server of the present invention transmits the connection request to the assigned server being continuously connected with the terminal.

As means of solution to the fifth challenge, in the preset invention, if a terminal or server issues a connection request to server resources other than a server assigned to serve it by the load balancing server, the connection request is rejected.

By the means of solution to the first challenge, the load balancing server does not have to terminate encrypted communication as well as decrypt the communication. Therefore, the processing task of the load balancing server can be reduced, load balancing intrinsic to the load balancing server can be accomplished, and forwarding delay, which otherwise would occur due to decryption on the load balancing server, can be prevented.

By the means of solution to the second challenge, it does not occur that a terminal permanently continues to connect to a server assigned for serving it. Therefore, it is possible to prevent long concentration of processing tasks on a particular server assigned and accomplish load balancing intrinsic to the load balancing server.

By the means of solution to the third challenge, it is possible to assign a connection or communication processing request even from the source without the function of redirection by redirect notification to a server. Therefore, it is feasible to apply load balancing even to a connection or communication processing request from the source without the function of redirection by redirect notification.

By the means of solution to the fourth challenge, when a continuous connection is established between a terminal and a server assigned, the resources of the server can be used effectively. Consumption of the resources of multiple servers assigned for serving a single terminal can be prevented.

By the means of solution to the fifth challenge, it is possible to prevent an arbitrary connection to server resources other than a server assigned by the load balancing server. Therefore, load balancing intrinsic to the load balancing server can be accomplished.

BRIEF DESCRIPTION OF THE DRAWINGS

FIG. 4 shows an example of a message which a terminal sends to the SIP load balancing server;

FIG. 5 shows an example of a redirect response message to notify the terminal of the address of a SIP server serving the terminal;

FIG. 6 shows an example of a message which the terminal sends to the serving SIP server;

FIG. 7 shows an example of a load balancing management table;

DETAILED DESCRIPTION OF THE PREFERRED EMBODIMENTS

First Embodiment

Figure 1:
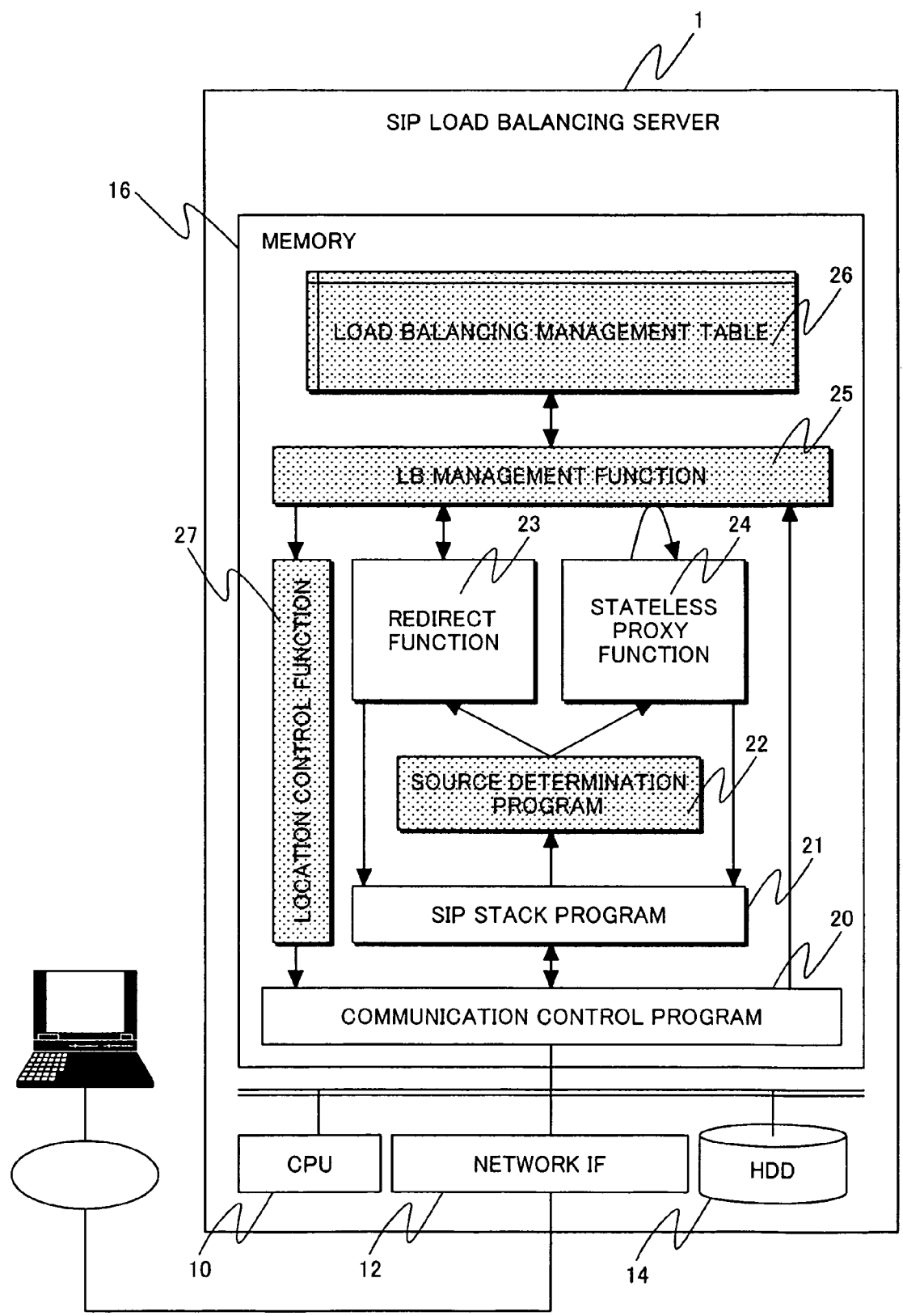
FIG. 1 shows an example of a SIP load balancing server architecture.

FIG. 1 shows an example of a SIP load balancing server architecture for a first embodiment of the invention. Although SIP is taken as an example in the first embodiment, the invention may be applied to other application layer protocols (other session control protocols). The SIP load balancing server 1 includes a CPU (10), a memory (16), and a storage device (14) and a suite of programs for control which will be detailed below is stored. When the SIP load balancing server operates, the control program suite is loaded into a memory space provided in the mainframe and executed by the CPU. The storage device may be installed in the mainframe, may be installed as an external storage device in another frame, or may be connected to the server via a network.

The load balancing server shown in FIG. 1 may include a user interface for allowing a user authorized to manage the server to operate the load balancing server. The user interface preferably includes, for example, a keyboard for command input, a mouse for input via GUI, a display screen, etc.

Detail of the above control program suite is described, using a set of blocks 20 to 27 shown in FIG. 1. The SIP load balancing server consist of a network interface 12 for transmitting and receiving packets, the CPU 10, HDD (Hard Disc Drive) 14, and memory 16. In the memory 16, a communication control program 20, a SIP stack program 21, a source determination program 22, a redirect function 23, a stateless proxy function 24, a load balancing (LB) management function 25, a load balancing management table 26, and a location control function 27 are stored.

The communication control program 20 parses a packet received via the network interface 12, trims or appends header information as necessary, and forwards the packet as appropriate. The SIP stack program 21, when receiving a SIP message packet, parses the SIP message packet and, when forwarding the SIP message packet, trims or appends the SIP header information as necessary, and prepares the packet so as to be transmitted via the communication control program 20. Upon receiving a SIP message, the source determination program 22 determines whether the previous hop source is a terminal 7 within the domain for which the SIP load balancing server is responsible. If the previous hop source is a terminal 7 within the domain for which the SIP load balancing server is responsible, the redirect function 23 retrieves the address of a SIP server 2 for serving this source terminal from the load balancing management table 26 via the LB management function 25 and notifies the terminal 7 of the retrieved address of the SIP server. When the LB management function 25 newly assigns a SIP server to serve a terminal 7 and newly registers this assignment into the load balancing management table 26, the location control function 27 notifies a location data base (DB) 3 of the relation between the terminal 7 and the serving SIP server 2 and instructs to register this relation.

If the previous hop source is other than a terminal within the domain for which the SIP load balancing server is responsible, the stateless proxy function 24 retrieves a SIP server 2 to which the destination terminal 7 has been assigned when coming online from the load balancing management table via the LB management function 25 and forwards the message, as a stateless proxy, to the SIP server thus retrieved.

Here, the stateless proxy refers to a proxy that simply forwards a received message according to destination resolution without performing dialog management and transaction management. Therefore, when the stateless proxy forwards, for example, a request message, it may not be included in the communication path along which a response message to the request is transmitted. In contrast to this, a transaction stateful proxy refers to a proxy that manages a request-response pair and performs retransmission control or the like if necessary.

Moreover, a transaction stateful proxy that manages a dialog starting with a request when a call is originated and terminating with a response when the call is disconnected in IP telephony, discards traffic not conforming to a state transition model, and uses a communication log for charging management is termed a call stateful proxy.

The load balancing management table 26 stores and manages relation of a terminal 7 to a SIP server 2. The LB management function 25 references and updates information in the load balancing management table 26. Here, the load balancing management table 26 may be stored in the HDD 14.

This embodiment assumes that all functional blocks 20 to 27 shown in FIG. 1 are realized by software processing, whereas the architecture shown in FIG. 1 may be realized in hardware using processors, signal processing circuits, and the like for the functional blocks.

Figure 2:
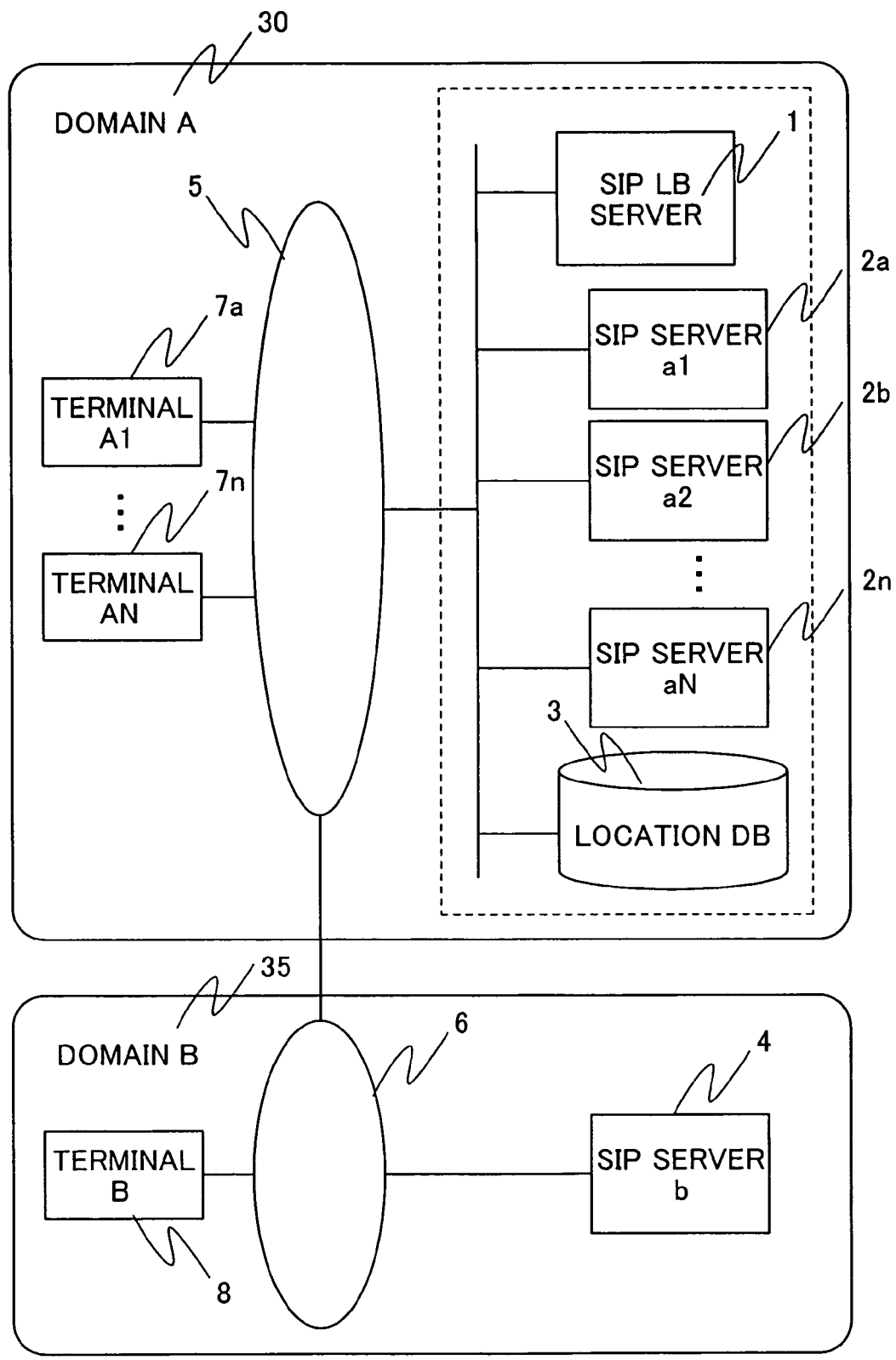
FIG. 2 shows an example of a SIP load balancing system architecture for an embodiment of the present invention.

FIG. 2 shows an example of a SIP load balancing system architecture for the first embodiment. The SIP load balancing system is composed of a domain A30 to which multiple terminals 7 belong, including a user A1 and a terminal 7*a* owned by the user A1, a terminal A*n* owned by the user A1 or another user A*n*, etc., and a domain B35 to which a user B and a terminal 8 owned by the user B belong. The domain B is shown as an example of a domain different from the domain A and the network system including more different domains may be built. Although a network configuration within the domain B where the terminal 8 and a SIP server b4 that accommodates the terminal 8 and controls a session with the terminal 8 are connected via a network 6 is shown, the network within the domain B may be configured with multiple terminals and multiple SIP servers, like the network within the domain A.

One feature of the SIP load balancing system for the first embodiment resides in that, when communication with multiple terminals 7*a* to 7*n* is treated by being shared across multiple SIP servers 2*a* to 2*n*, the SIP load balancing (LB) server 1 has a function of, in response to a query from a terminal 7, notifying the address of a SIP server 2 serving the terminal 7. At this time, the location DB3 which manages information about users and terminals belonging to the domain is commonly used by the SIP servers 2*a* to 2*n*. The SIP LB server 1, SIP servers 2*a* to 2*n*, location DB3, and terminals 7*a* to 7*n* are connected by the network 5. Furthermore the domain A and domain B are assumed to be interconnected by a network. Although, in FIG. 2, access to the location DB 3 may appear to be possible from the terminals 7 and nodes in another domain, each network may be separated so that the access is possible only from the SIP LB server 1 and SIP servers 2*a* to 2B. In this case, higher security is ensured.

Figure 3:
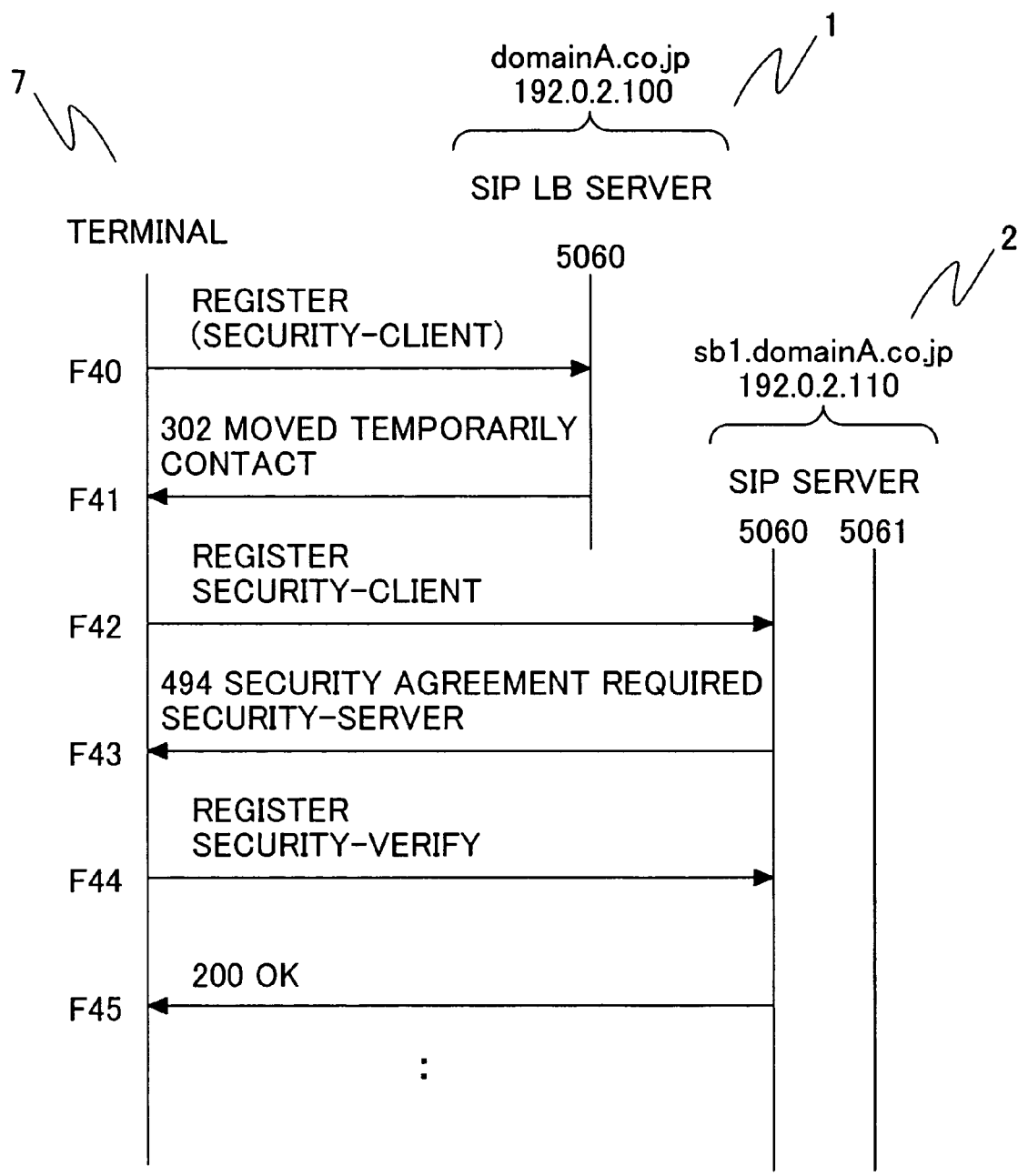
FIG. 3 is a sequence diagram showing an example of a procedure for connecting a terminal to a SIP server for serving the terminal.

FIG. 3 shows an example of a sequence to complete assigning a message from a terminal 7 to a SIP server 2 through the SIP LB server 1 in the SIP load balancing system for the first embodiment.

A terminal 7 in this embodiment is assumed to perform security protocol negotiation defined in RFC3329 before initiating encrypted communication. Therefore, sequence and message examples are shown in FIGS. 3 through 6 on the assumption that non-encrypted (plain text) communication is performed until the completion of security protocol negotiation. However, another encrypted communication method may be applied as long as the effect of the present invention is achieved.

FIG. 4 illustrates a message (F40) which is sent from a terminal to the SIP LB server and this message is a typical REGISTER request message not including security protocol negotiation information (Security-Client header), whereas the F40 message may include security protocol negotiation information.

Meanwhile, FIG. 5 illustrates a response message (F41) which is returned from the SIP LB server 1 to the terminal 7 to notify the terminal of the address of the serving SIP server. As this response, a 302 response not including security protocol negotiation response information (Security-Server header) is used. This is because, even if the F40 message includes security protocol negotiation information, the LB sever itself does not perform this negotiation and, therefore, the F41 message, normally, does not include information about security protocol negotiation (Security-Server header). However, the F41 message may include information about security protocol negotiation. The 302 response may be used as the F41 message, though contravening the definition of RFC3329. Alternatively, in compliance with the definition of RFC3329, a 423 response or 429 response in which information for security protocol negotiation can be specified may be used as the F41 message.

Furthermore, in this embodiment, an example where the 302 response (F41) is used as a redirect notification message is presented, whereas any other response designated by a three-digit code beginning with 3 or a particular response code not reserved may be used, provided that network interface specifications of the LB server match with those of the terminal side.

The SIP LB server 1 is assigned a virtual domain name (e.g., domainA.co.jp) as an address representing the domain under its management. The "virtual domain name" means that the address of the SIP LB server 1 is made open on behalf of the addresses of the SIP servers that actually process messages. When starting to use a service, a terminal 7 transmits the REGISTER message (F40) to this address (that is, the SIP LB server) (50). On the SIP LB server 1, if the source determination program 22 determines that the previous hop source of the received message is the terminal 7, the LB management function 25 determines a SIP server 2 for serving the terminal 7. The SIP LB server 1 notifies the terminal 7 of the address of the determined SIP server by the 302 response (F41). For this notification, the address of the SIP server 2 is specified in a Contact header (54), as show in FIG. 5.

Upon receiving the 302 response (F41), the terminal retransmits the message (F42) to the address made known in the Contact header of the 302 response. In this message content, as is illustrated in FIG. 6, the address made known in the Contact header of the 302 response is specified on the Request-Line (56). In this message, the SIP-URI (52, 56) assigned to the user or terminal and the contact address (53, 59) remains the same as in the original message.

FIG. 7 shows an example of a structure of the load balancing management table 26 on the SIP LB server 1 for the first embodiment. As shown in FIG. 7, the load balancing management table 26 stores and manages the relation between a terminal and a SIP server which has been assigned, for example, upon receiving the REGISTER (40) request sent from the terminal coming online. Specifically, when a SIP server is assigned to serve a terminal, an entry (62) of the SIP-URI of the user or terminal specified in the From header of the request message from the terminal is added and a bit value of 1 is set in the column (60) of the SIP server assigned to the SIP-URI.

Meanwhile, when the LB management function 25 determines which SIP server should be assigned to serve a terminal 7, it refers to the number of terminals served (64) by each SIP server and newly assigns, for example, a SIP server with the smallest number of terminals served. Because the load on each SIP server can be estimated from the number of terminals served (64), by assigning a SIP server, referring to the number of terminals served (64), assignment depending on the load on each SIP server can be performed and closer load balancing can be achieved.

The total number of terminals served by each server can simply be counted in the following way: in the column of a SIP server, a count of "1" is set in the cell of a terminal when the SIP server is assigned to serve the terminal and the total sum of "1" counts is taken as the number of terminals served. It may also be preferable to weight each SIP server according to the performance of each SIP server and determine which server should be assigned, based on the weighting. By weighting each SIP server according to the performance of each SIP server, if server specifications (e.g., CPU performance, memory capacity, etc.) differ among the SIP servers, assignment depending on the difference of the server specifications can be performed and closer load balancing can be achieved.

If an encrypted communication protocol which is a preference for the terminal 7 is specified (e.g., as security negotiation information) in the F40 request, weighting per protocol for encrypted communication applicable to terminal to SIP server communication may be performed. Since encryption/decryption or encoding/decoding processing loads differ from one protocol to another for encrypted communication, by weighting per protocol for encrypted communication, SIP server assignment depending on load difference per protocol for encrypted communication can be performed and closer load balancing can be achieved. If weighting is applied, it is preferable to register a value determined by weighting into the column of each SIP server. It may also be preferable to, for each of all applicable encrypted communication protocols, determine a SIP server or servers which should be assigned if it is applied. In a case where services and arrangements vary, according to whether encryption is applied and difference among the encrypted communication protocols, investment in facilities and management can be simplified.

Figure 8:
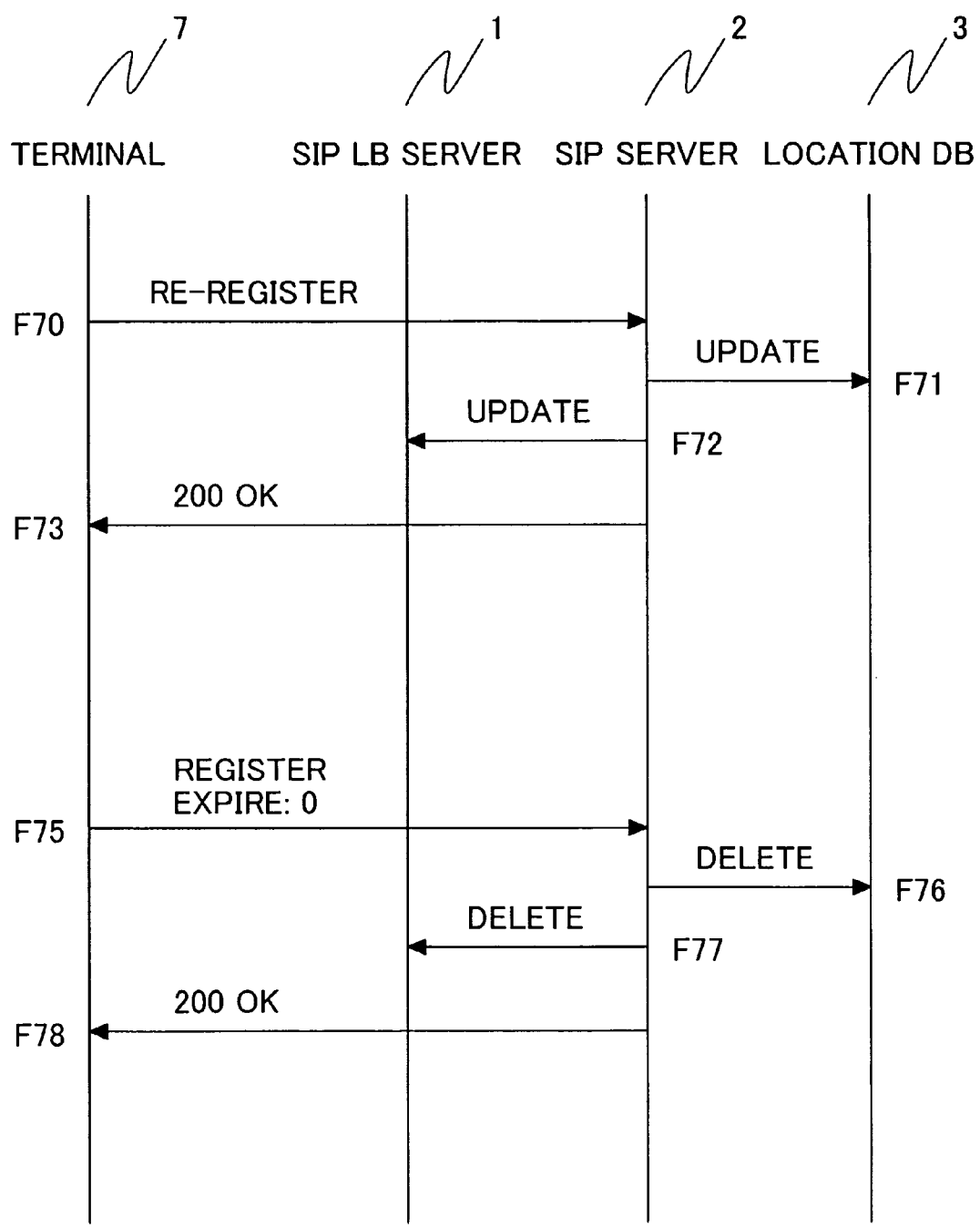
FIG. 8 is a sequence diagram showing an example of a method of controlling time to live (TTL) for service of a SIP server assigned by the SIP load balancing server.

FIG. 8 is a sequence diagram showing an example of a method of controlling time to live (TTL) for service of a SIP server assigned by the SIP LB server for the first embodiment. The SIP LB server for the first embodiment notifies the terminal 7 of the address of the SIP server assigned to the terminal 7 and, at the same time, notifies the terminal 7 of the TTL for service of the assigned SIP server. For example, the TTL is notified, included as an expires parameter (FIG. 5, 54) in the Contact header of the 302 response. The thus notified TTL value is the longest service time allowed in terms of a session. This longest service time can be set according to the location and usage of the system.

In a case where a session termination notification is not sent from the terminal due to a fault or the like, though the session actually has terminated, by setting the TTL, the server resources can be released. Consequently, uneconomical continuous use of SIP server resources can be prevented.

Meanwhile, a sequence for deleting an entry from the load balancing management table 26 is shown in the later part of FIG. 8. Upon receiving a DEREGISTER (F75) message submitted from the terminal that is going offline, the SIP server 2 performs a normal process of deleting location information for the terminal (F76) and, moreover, sends the SIP LB server 1 a command to delete the entry of the user (or terminal) from the load balancing management table 26 (F77). Within the SIP LB server 1, the LB management function 25 that received this command deletes the entry from the load balancing management table 26. By this deletion, an event that the SIP server assigned to the terminal coming online is released when the terminal is going offline can be managed on the load balancing management table 26. If the terminal does not send the DEREGISTER message (F76) when going offline, the SIP server 2 issues a request to delete the entry when the TTL for the registration period expires. This deletion at the expiry of TTL avoids that the terminal permanently connects to the assigned SIP server. Therefore, long concentration of processing tasks on a particular SIP server assigned can be prevented and load balancing intrinsic to the LB server can be accomplished.

Although timer management of TTL on the SIP LB server is not performed in the above method, alternatively, timer management of TTL may be performed on the SIP LB server. For this management, it is necessary to match the serviceable period of a SIP server assigned to a terminal with the TTL for the registration period. In this regard, extension of the TTL for the registration period must be taken into consideration. First, the same value as the TTL of the assigned SIP server notified to the terminal 7 by the F41 redirect notification is notified to the terminal 7 as the TTL for the registration which is specified in an acknowledgement response (200OK (F45)) to the REGISTER request. In the load balancing management table 26, columns for TTL for service of each SIP server are added to the table structure of FIG. 7.

Setting TTL may be performed as follows: if the length of TTL is statically fixed, absolute time from a start time may be recorded or an end time may be pre-estimated and recorded. In the latter case, an estimated end time is recorded and, when appropriate, checked by comparison to the present time, and the processing load is reduced more. If variable TTL is set per connection, it is better to record an end time. Thereby, even if TTL is variable, a consistent check procedure can be performed. Furthermore, not only when receiving DEREGISTER (F75), but also when receiving a REGISTER update request (F70), the SIP server 2 issues a request to update the entry in the load balancing management table to the SIP LB server (F72). In this case, the same sequence as the sequence from F70 to F73 in FIG. 8 is executed.

Because, in this method, the SIP LB server performs timer management of TTL for a registration period, it is not necessary for the SIP server 2 to send a request to delete the entry to the SIP LB server 1 at the expiry of the registration TTL. At expiry of TTL managed on the SIP LB server (by the LB management function 25 and load balancing management table 26), the LB management function 25 deletes the relevant entry from the load balancing management table 26.

Figure 9:
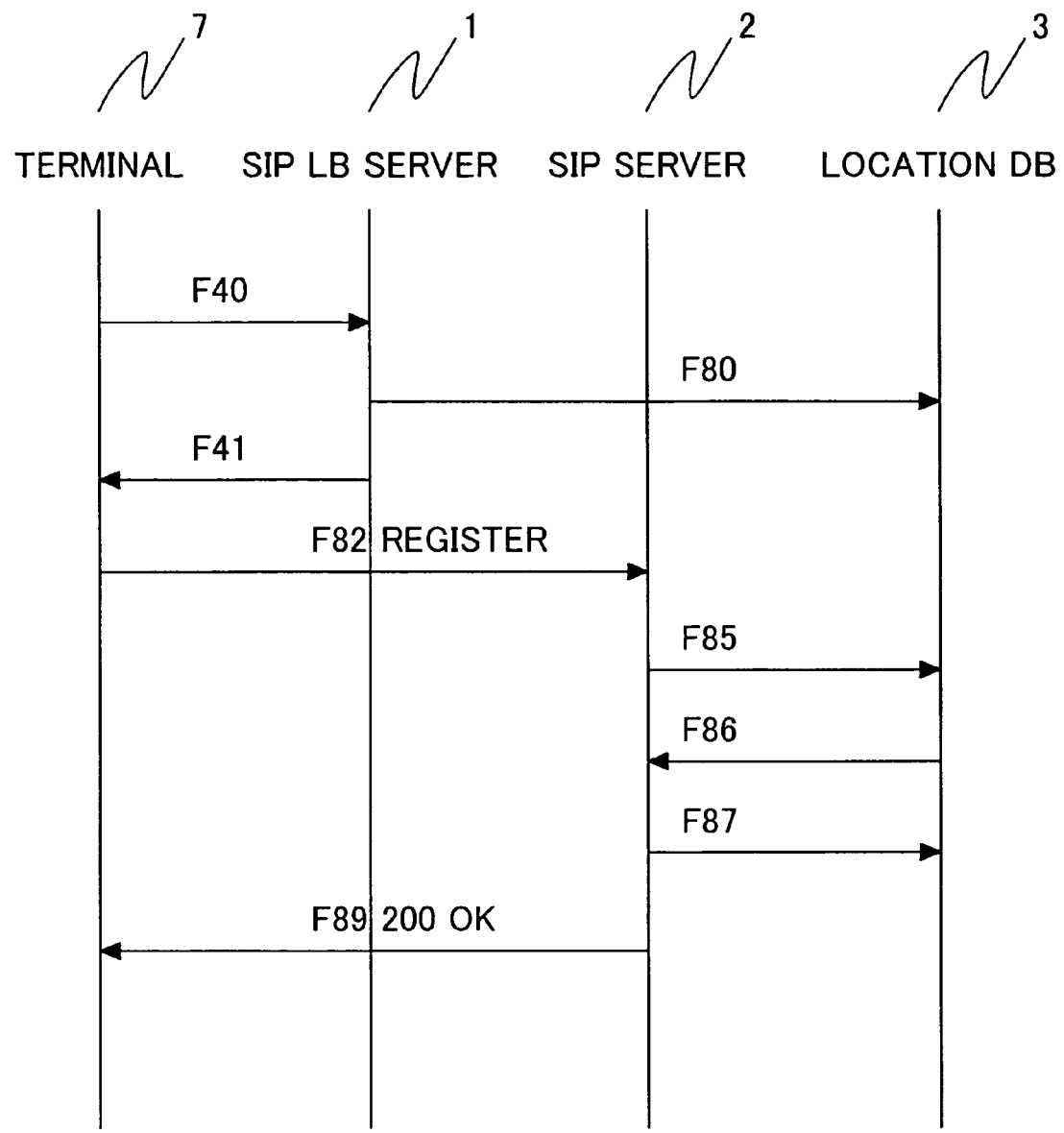
FIG. 9 is a sequence diagram showing an example of a method for preventing connection of a terminal to a SIP server without being permitted by the SIP load balancing server.

FIG. 9 is a sequence diagram showing an example of a method for preventing connection of a terminal 7 to a SIP server 2 without being permitted by the SIP LB server 1 in the SIP load balancing system for the first embodiment. The SIP load balancing system of this embodiment is not a model in which all traffic is forwarded by the SIP LB server 1. This system is a model in which the SIP LB server 1 notifies a terminal of a SIP server 2 serving the terminal and instructs to connect to that SIP server. Therefore, if arbitrary connection of a terminal 7 to any SIP server other than a SIP server assigned to serve the terminal by the SIP LB server 1 occurs, load balancing management is not completely fulfilled and loads are not distributed well. In the operation manner of the SIP load balancing system of this embodiment, the address of the SIP LB server 1 is disclosed, but the addresses of the SIP servers 2 are, in principle, not disclosed. However, once a terminal has received a redirect notification (F41) from the SIP LB server 1, the terminal knows the address of the SIP server assigned from the notification because this server address is given in the Contact header (54). It is conceivable that, after the terminal is disconnected from the SIP server whose address was made known, it directly reconnects to the same server without the intervention of the SIP LB server 1 and this poses the above problem. Thus, the SIP load balancing system of this embodiment adopts the method for preventing direct terminal-server connection, which will be explained below.

In the same procedure as shown in FIG. 3, when a terminal 7 sends a request to the SIP LB server 1 (F40), the SIP LB server 1 determines which SIP server 2 should be assigned to serve the terminal and notifies the terminal 7 of the address of the assigned SIP server 2 (F41). At the same time, the SIP LB server 1 registers the address of the SIP server 2 assigned to the terminal 7 (or user) into the location DB3 which is commonly used by the SIP servers 2a to 2n (F80).

Figure 10:
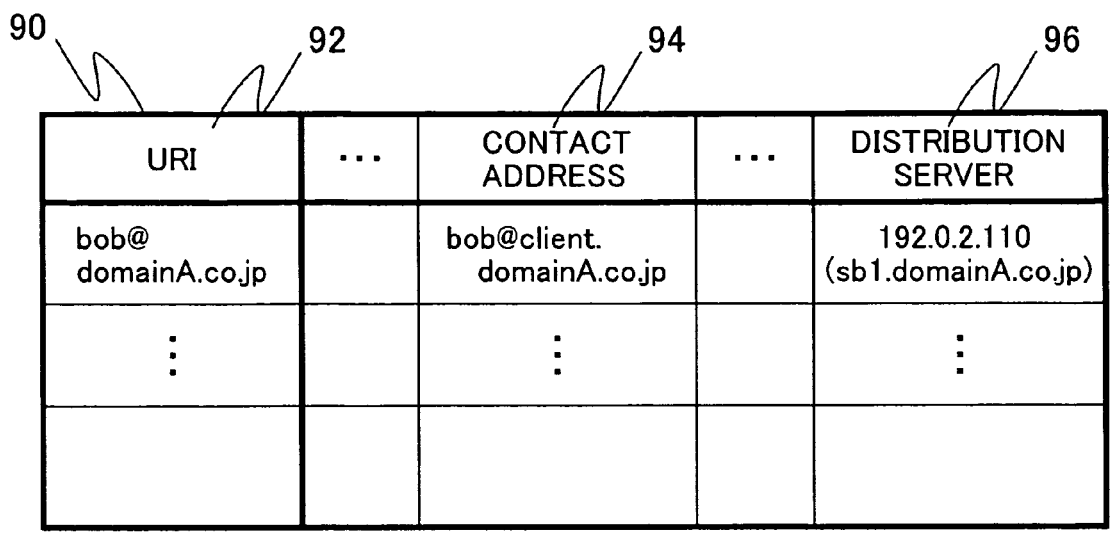
FIG. 10 shows an example of an extended location table.

Location information per terminal typically includes the SIP-URI (92) assigned to the user or terminal, the Fully Qualified Domain Name (FQDN) or IP address as the contact address (94) of the terminal 7, etc. which are registered and managed. Although such information may be statically set for operation, information such as the SIP-URI of the user or terminal (so-called user name (U-Name)) and the contact address of the SIP server assigned to the SIP-URI SIP system may be registered upon receiving the REGISTER request from the terminal in the SIP system. In the SIP load balancing system of this embodiment, a location table 90 managed in the location DB3 is extended in a form as is shown in FIG. 10. To the information which is managed per user address in traditional management, the address of the SIP server 2 assigned to (serving) the terminal is newly added (96).

Information is registered into this extended location table 90, when the location DB receives the command in the F80 step; that is, a pair of the user name of the terminal (or user) that sent the request to the SIP LB server 1 and the address of the assigned SIP server 2 is registered. Meanwhile, contact information or the like is additionally registered (F85) when the assigned SIP server 2 receives a REGISTER request (F82) from the terminal 7 and accepts the REGISTER.

As described for the TTL for service of a SIP server in FIG. 8, in the SIP load balancing system of this embodiment, the following is assumed: during the TTL for service which is, for example, taken as a period from the time when a terminal registers with the SIP LB server when coming online to the time when the terminal deregisters when going offline, once a SIP server has been assigned to serve the terminal coming online, the terminal directly communicates with the assigned SIP server without the intervention of the SIP LB server 1. During this period, the SIP server 2 receives messages directly from the terminal 2. When the SIP server 2 receives a message, for example, the first REGISTER message from the terminal 2 (F82), it verifies whether itself is permitted to serve the terminal, that is, whether itself is the SIP server assigned to the terminal which sent the REGISTER message, referring to the information in the extended location table 90 at steps F85 and F86. If itself is the SIP server assigned to the terminal which sent the REGISTER message, the SIP server additionally registers information such as the contact address obtained from the REGISTER message into the extended location table 90 (F87) and returns a response to the terminal (F89). Otherwise, if no SIP server is assigned to the terminal which sent the REGISTER message or if the assigned SIP server is not itself, when referring to information in the extended location table 90 at steps F85 and F86, the SIP server returns an error (e.g., 403 Forbidden or the like) at step F89 without registering the contact address at step F87. By executing this procedure, direct communication between a terminal and any SIP server other than a SIP sever assigned to serve the terminal by the SIP LB server 1 is prevented in the SIP load balancing system of this embodiment.

In this relation, the entry for a terminal in the extended location table 90 is cleared in the same timing as the normal step of deleting location information; that is, when the TTL for the terminal's registration period expires or when the terminal sends a DEREGISTER message, the SIP server sends a delete command to the location DB 3 to clear the entry. By way of example, the registration sequence from the terminal to the SIP server (from F82 to F89) shown in FIG. 9 does not include security negotiation. In the case of the registration sequence including security negotiation like the one shown in FIG. 3, following the step F44, the sequence from F85 to F87 between the SIP server and the location DB3 is executed.

Second Embodiment

Figure 11:
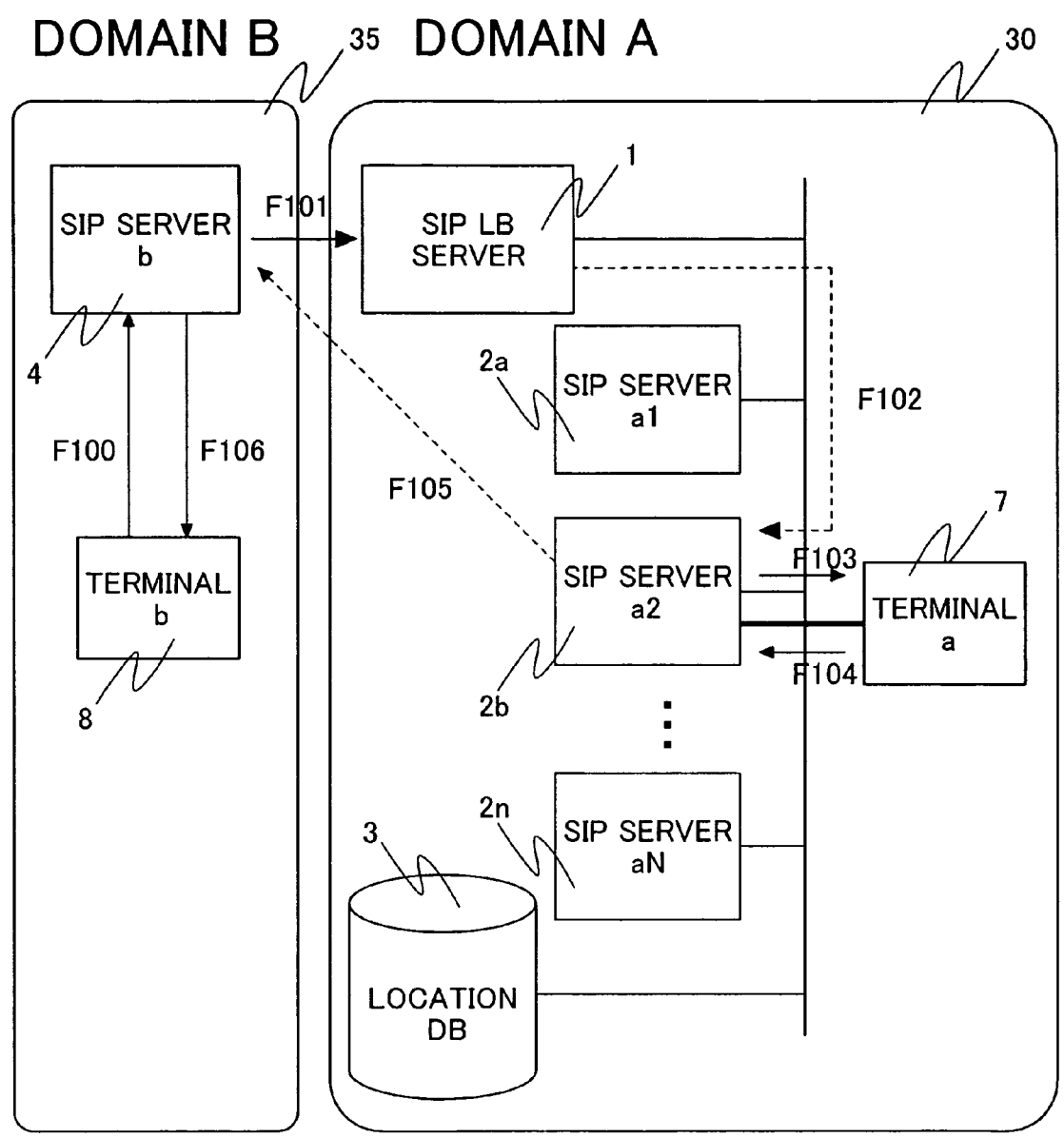
FIG. 11 shows an example of a method of receiving a message passed across domains in a SIP load balancing system.

In a SIP load balancing system for a second embodiment, FIG. 11 shows an example of a method for handling a request message addressed to a terminal 7 in the local domain, routed via a SIP server 4 in another domain.

A request message which is transmitted from a terminal 8 belonging to another domain (domain B) 35, addressed to the terminal 7 belonging to the local domain (domain A) is first transmitted to the SIP server b 4 to which the terminal 8 belongs (F100). The SIP server b4 forwards the received request message to a SIP server in the domain to which the destination terminal 7 belongs. In the operation of the SIP load balancing system for the second embodiment, the SIP LB server 1 is assigned a SIP server representative address (e.g., domain A.co.jp) for managing the domain A. Thus, the request message which is forwarded via the SIP server b4 is sent to the SIP LB server 1 (F101).

On the SIP LB server 1 that received the request message sent from the SIP server b4 in another domain, the source determination program 22 determines that the previous hop source of the received request message is not a terminal in the local domain. Thus, the LB management function 25 refers to the load balancing management table 26 and finds a SIP server assigned to manage communication (session) with the destination terminal. Then, the SIP LB server 1 statelessly forwards the message to the SIP server (F102). The wording "statelessly" mentioned here means the same operation as the stateless proxy operation defined in RFC3261 for SIP specifications. That is, the SIP LB server 1 does not care about session state transition in subsequent communication and it forwards a message so that a subsequent transaction including a response message does not have to be passed via it again. Specifically, the SIP LB server 1 forwards a message it received without attaching a Via header, Record-Route header, etc. which are normally attached to a message when the message is routed by a SIP server to ensure the same communication path of messages. In this manner, once the SIP LB server 1 has forwarded a message to an appropriate SIP server, it does not have to be involved in the session established and is released from the processing load for managing the session.

A SIP server a2 (2b) to which the request message has been forwarded from the SIP LB server 1 refers to location information, finds a contact address associated with the user address specified for the destination of the message, and forwards the message to the contact address (F103). Since the SIP server for this embodiment is assumed to register and manage location information for a terminal it serves within the server, communication between the server and an external unit for reference to location information is not included in the relevant sequence. However, reference may be made to the extended location table 90 managed in the location DB3. In this embodiment, the server manages location information for a terminal it serves within it, which produces an effect in which the time for communication between the SIP server and the location DB can be cut.

On the other hand, a response message is returned, routed in accordance with information in the Via header attached to the request message in order of F104, F105, and F106. Unlike the request message route, here, the response message is not passed through the SIP LB server 1, because the SIP LB server 1 forwarded the request statelessly, not adding its address to the Via header. Subsequent communication between the terminal 8 and the terminal 7 is routed through a Route set which is generated, based on information in the Record-Route header, which each SIP server added when it forwarded the request. This route is the same as the route of the response message communication (that is, it does not include transit through the SIP LB server 1).

Figure 12:
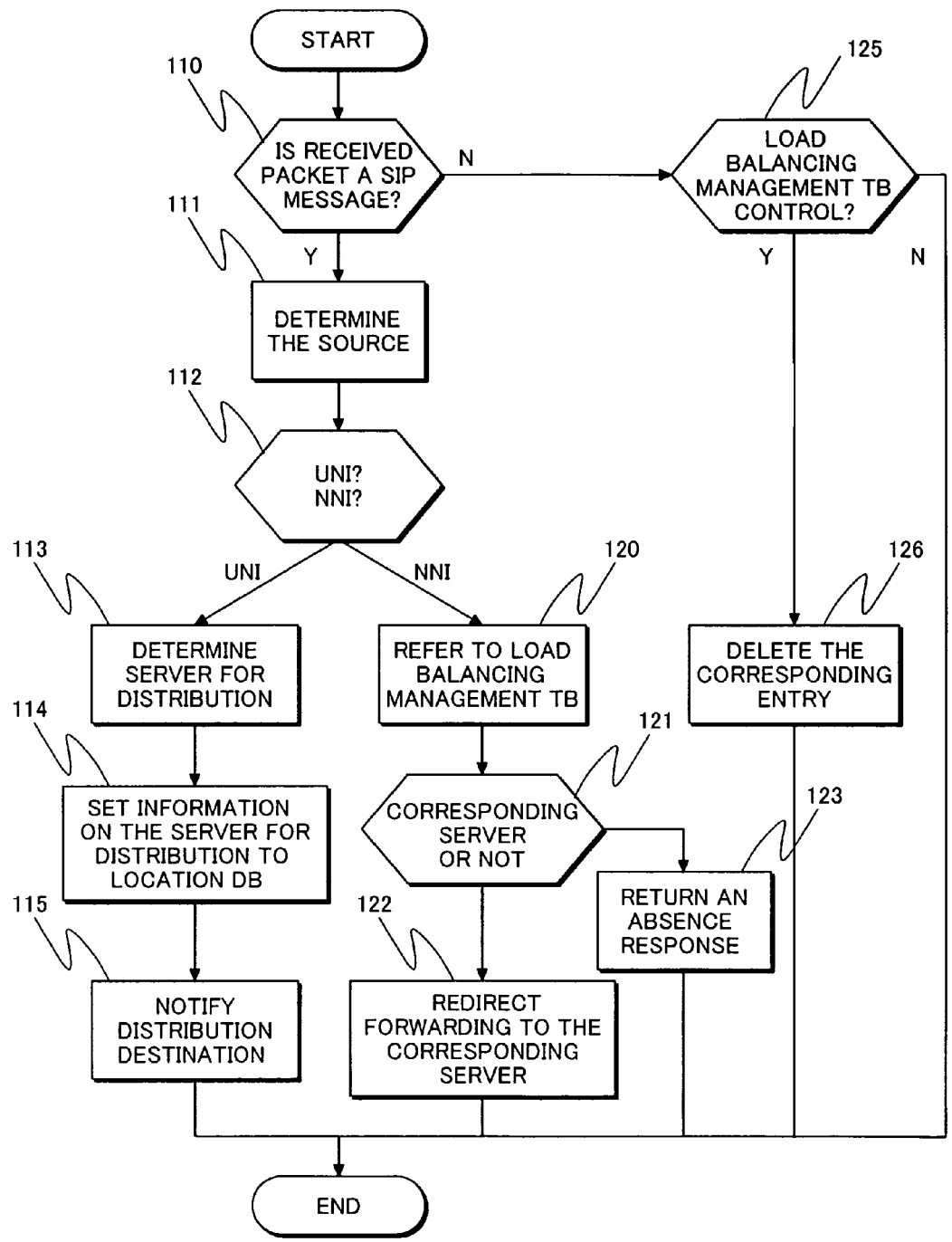
FIG. 12 is a flowchart showing an example processing on the SIP load balancing server when receiving a packet.

FIG. 12 is a flowchart of processing on the SIP LB server 1 when receiving a packet, according to the second embodiment. Upon receiving a packet via the network interface 12, the communication control program 20 checks whether the received packet is a SIP message (step 110). If the received message is a SIP message, the SIP stack program 21 parses the message and the source determination program 22 checks whether the previous hop source of the message is a terminal within the local domain (step 111, step 112). If the source is a terminal in the local domain, the LB management function 25 determines an appropriate SIP server to serve communication with the terminal, referring to the load balancing management table 26 (step 113). After the determined SIP server information is set in association with the terminal's user address entry (step 114), the SIP LB server notifies the terminal of this information by using the redirect function 23 (step 115).

At steps 111 and 112 for source determination, if the previous hop source of the message is other than a terminal within the local domain, for example, it is a SIP server in another domain, as shown in FIG. 11, the LB management function 25 refers to the load balancing management table 26 (step 120) and looks for a SIP server which serves communication with the destination terminal (step 121). If such a SIP server is found in the table, the SIP LB server forwards the message to that server by using the stateless proxy function 24 (step 122). If such a SIP server is not found, the SIP LB server regards the destination terminal as being offline and returns an error response (e.g., 404 Not Found) to the source (step 123).

Meanwhile, at step 110 for determining what is contained in the received packet, if the received packet is other than a SIP message, the communication control program 20 determines whether it is a command packet to delete an entry from the load balancing management table 26, like the F77 message in FIG. 8 (step 125). If it is the command to delete an entry, the LB management function 25 deletes the entry from the load balancing management table 26 (step 126).

At step 111, several methods of source determination are conceivable. One method is to refer to the From Header information 52 included in the SIP headers of the received request message. If the domain name following the "@" mark matches the local domain name, it is determined that the message was sent from a terminal within the local domain. By making this determination, the LB server can determine what action it should take. In the case of this embodiment, for example, if the message source is a terminal in the local domain, the LB server notifies the source terminal of the address of a SIP server to serve the terminal. If the message source is a terminal or server in another domain, the LB server of the present invention statelessly forwards the message to a SIP server which serves the destination terminal.

As an alternative to the same method of source determination by referring to the From Header information 52 included in the SIP headers of the received request message, the From Header information 52 may be compared to subscribers' information for each subscriber in the local domain. The subscribers' information to which compassion is made consists of individual SIP-URIs, or user addresses respectively assigned to the users or terminals in the domain. In this case, subscribers information is searched to find a user address matching with the SIP-URI specified in the From header included in the SIP headers of the received request message. As a result, if a match is found, it is determined that the message was sent from a terminal within the local domain. By making the determination in this way, if a valid domain is specified, but the user ID is an invalid address (e.g., a randomly set address), it becomes possible to detect this before assigning a SIP server and reject the message. Therefore, it can be prevented that a load created by a message with an invalid address is placed on SIP server resources.

The subscribers' information may be held within the SIP LB server 1 or held in the location DB and referred to or an independent DB server may be provided to manage the subscribers' information and referred to. If an IP address range within which an IP address is assigned to a terminal within the local domain is specifiable, the source determination can be made, depending on whether the source address given in the IP header of the received request message falls within this range. This range may be specified as a range of IP address numbers, for example, from "133.144.0.1" to "133.144.0.255".

By making the source determination according to an IP address range, even terminals that are unable to transmit a request using a domain address can be served. Assignment is performed independently of subscribers information corresponding to IP addresses and assignment does not depend on registration, deregistration, service change, etc. per subscriber; subsequently, assignment processing tasks are reduced.

Still another method may be taken. The SIP LB server holds a list of the addresses of SIP servers or the like in another domain, which are interconnected with the LB server. By comparing the source address given in the IP header of the received request message to this list, the LB sever determines whether the message is communicated from another domain. By this source determination method, SIP servers in another domain which are interconnected with the LB server can be qualified. The LB server performs connection restriction based on the above list and connection restriction can be performed without placing burdens on the SIP servers it manages.

Third Embodiment

Figure 13:
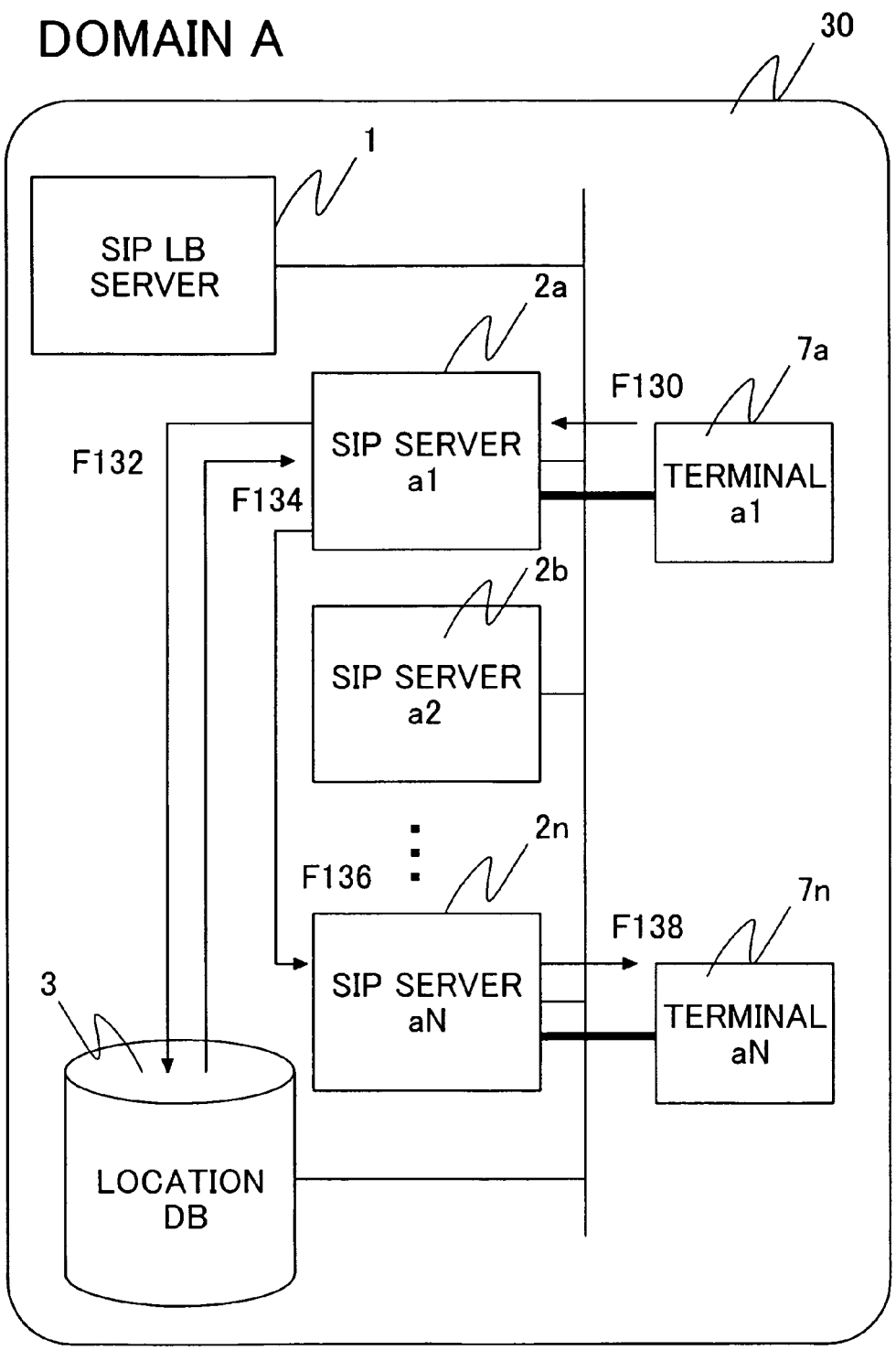
FIG. 13 shows an example of a method of communication between terminals within one domain.

FIG. 13 shows an example of a method of communication between terminals in one domain in a SIP load balancing system for a third embodiment. A terminal a1 (7*a*) and a terminal aN (7*n*) have set up continuous connections (sessions), respectively, with a SIP server a1 (2*a*) and a SIP server aN (2*n*) notified from the SIP LB server 1 in the same procedure as described for FIG. 3. In this state, how a request message from the terminal a1 is routed to the terminal aN is described.

The request message issued by the terminal a1 is first sent to the SIP server a1 having an established session with the terminal a1 (F130). By referring to the destination of the message, the SIP server a1 knows that the destination is a terminal belonging to the same domain. Now, if the server maintains location information for the terminals that it serves in a cache on a memory or a local hard disk, it checks whether the destination terminal's information is found in the location information in the cache. If the destination terminal's information is found in the cache, the server forwards the message to the contact address recorded there. If the destination terminal's information is not found in the cache, the server refers to information in the extended location table 90 maintained on the location DB 3 (F132, F134). If the destination terminal aN (7n) is online, information 96 for a SIP server which serves communication with that terminal and manages the session therewith is registered in association with the SIP-URI 92 of the terminal in the location table. Thus, by referring to the SIP server information 96 associated with the terminal's SIP-URI, the server forwards the message to the address of the SIP server obtained from this table (F136). Finally, the SIP server aN (2n) which received the message checks the destination of the message and refers to location information in the same procedure as the SIP server a1 (2a) does and forwards the message to the terminal aN (7n). By thus using the existing sessions, consumption of the resources of SIP servers and terminals can be reduced. By using the existing sessions, key exchange and authentication procedures for establishing new encrypted communication paths can be omitted; consequently, the loads of the SIP servers and terminals can be reduced more. Unless each SIP server maintains location information for the terminals it serves in the cache, the server simply refers to information in the extended location table 90 maintained on the location DB3.

In this relation, contact address information 94 for each terminal is also registered and managed in the extended location table 90. Therefore, when reference is made to the extended location table at steps F132 and F134, the server knows the contact address of the destination terminal aN (7n) as well. Thus, it is possible for the SIP server a1 (2a) to directly forward the message to the destination terminal aN (7n) without the intervention of the SIP server aN (2n).

However, if the session between the terminal aN (7n) and the SIP server aN (2n) is a communication path that has been established through an authentication procedure and a secure communication path along which encrypted packets are sent and received, it may also be preferable to apply a policy in which packets that are sent and received on this session are allowed as those having assured security, whereas packets that are sent on other connections (e.g., packets that are directly forwarded from the SIP server a1 to the terminal aN as above) are not allowed. In that event, to carry out security assured communication, it is desirable to forward packets along the route via the SIP server aN, as shown in FIG. 13. By applying the policy that packets not having assured security transmitted along other connections are not allowed as above, packets having assured security can be forwarded distinguishably from other packets. The architecture of a SIP server that performs forwarding described for FIG. 13 and the server operation flow are described with FIGS. 14 and 15, respectively.

Figure 14:
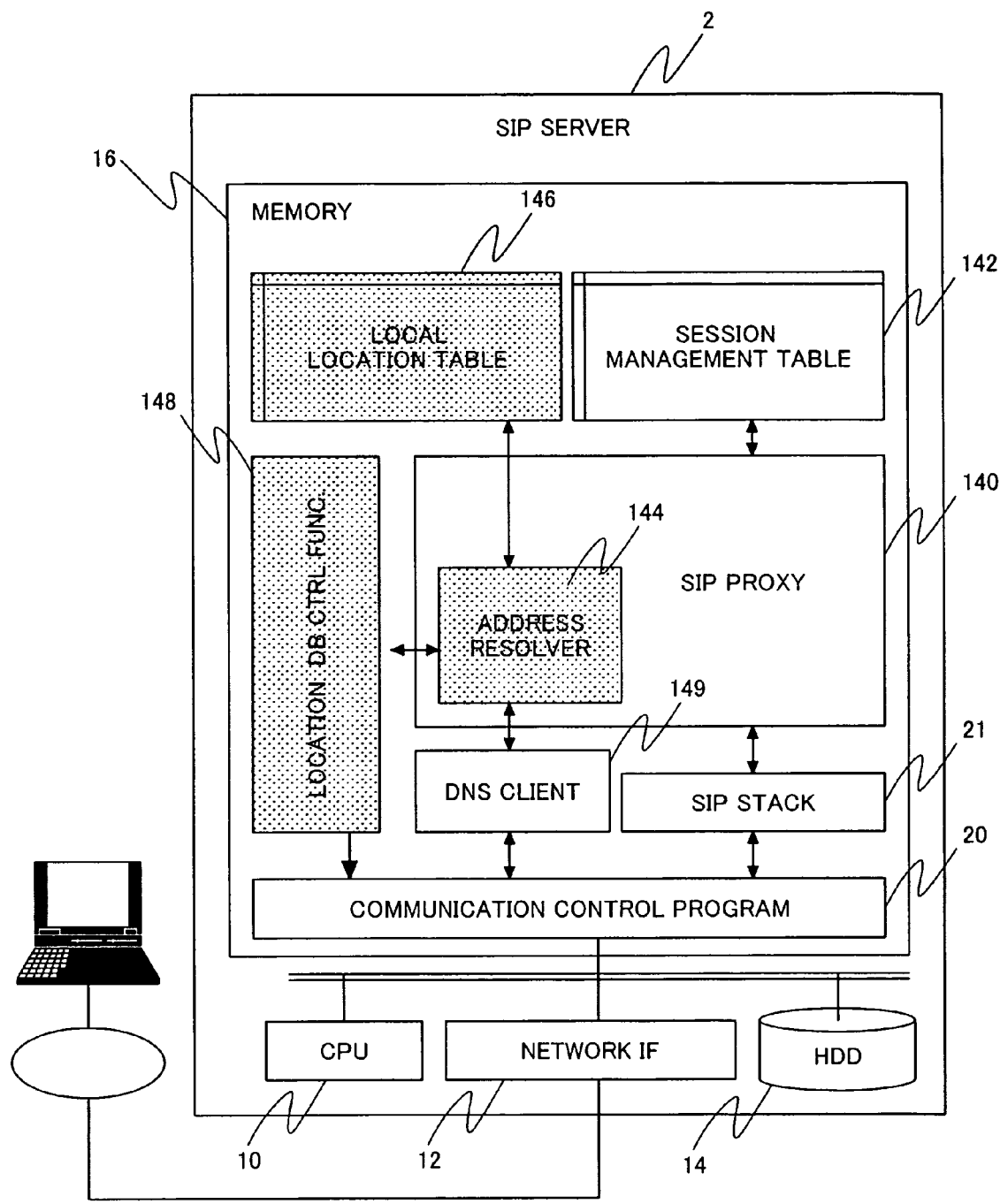
FIG. 14 shows an example of a SIP sever architecture.
Figure 15:
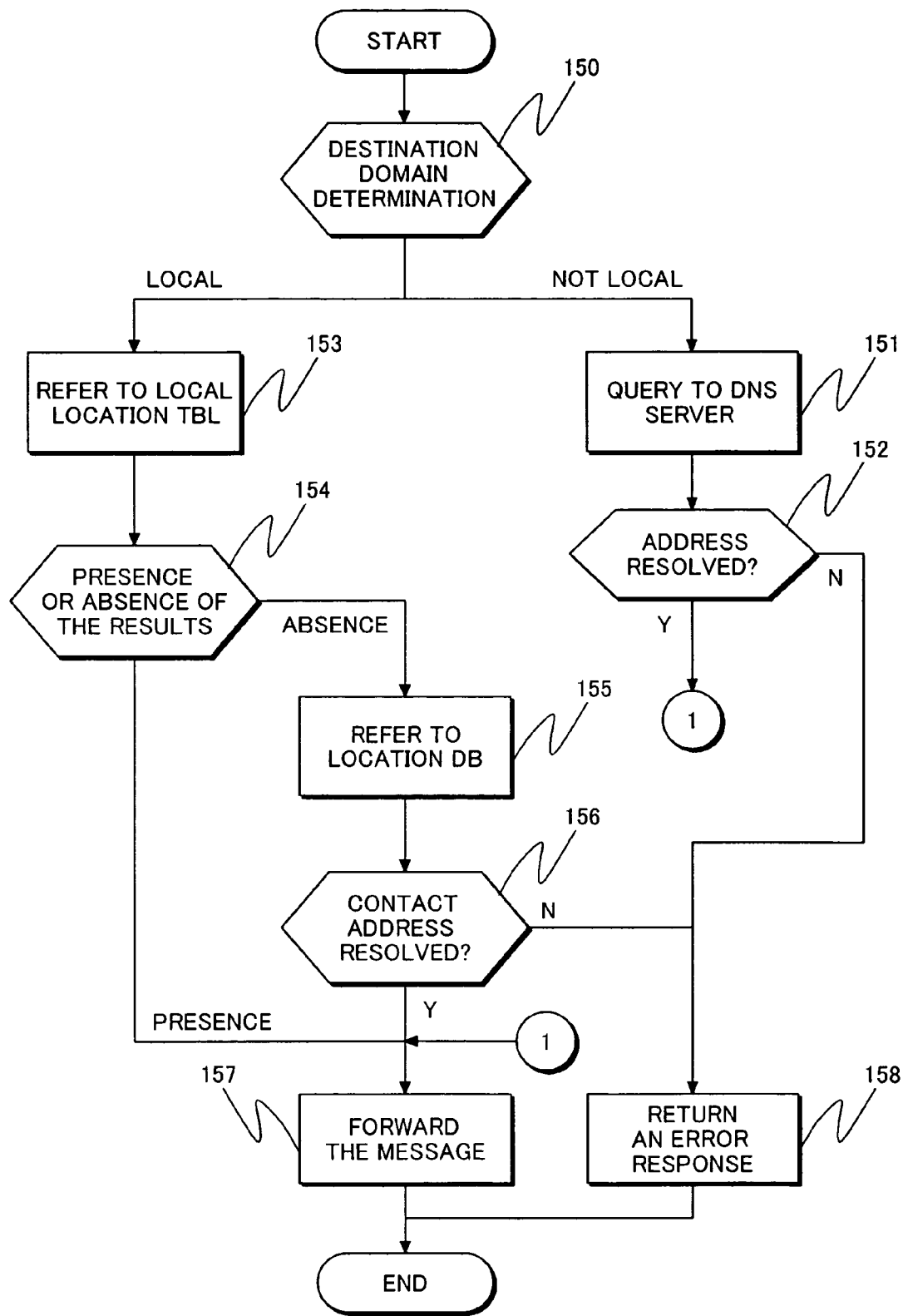
FIG. 15 is a flowchart showing an example of forwarding destination address resolution processing on a SIP server.

FIG. 14 shows an example of architecture of a SIP server 2 for the third embodiment. Like the SIP LB server shown in FIG. 1, the SIP server includes a CPU 10, a memory 16, a storage device 14, and a network interface 12. A suite of programs for controlling the SIP server, stored in the storage device, is loaded into the memory and executed by the CPU when the server operates. The storage device may be installed in the mainframe, may be installed as an external storage device in another frame, or may be connected to the server via a network. The SIP server may include a user interface for allowing a user authorized to manage the server to operate the SIP server. The user interface includes a keyboard for command input, a mouse for input via GUI, a display screen, etc.

A communication control program 20 and a SIP stack program 21 are the same as those shown in FIG. 1. Reference numerals 140 to 149 denote main components of the SIP server including a SIP proxy program, though they are simplified. The SIP proxy program 140 includes an address resolver 144 to resolve a forwarding destination address. This forwarding destination address resolver will be detailed later, using a flowchart of FIG. 15. A session management table 142 manages the state transition of each call. A local location table 146 manages location information such as the SIP-URI, contact address, etc. of each terminal that the SIP server serves. While the session management table 142 and the local location table 146 are depicted as the tables stored on the memory 16 in FIG. 14, they may be database tables stored on the storage device 14. The local location table may not be held within the SIP server; instead, location information may be held on an external location DB and the DB accessed, when necessary. However, for rapid forwarding of SIP messages, holding the location information for each terminal that the SIP server serves in a form like the local location table 146 within the server is more advantageous than referring to the external location DB3 whenever necessary.

The address resolver 144 first refers to the destination information of a received message and checks whether the message is addressed to a terminal within the domain managed by the SIP server (addressed to the local domain) (step 150). If the destination of the message is a terminal in the local domain, the address resolver 144 refers to the local location table 146 and checks whether the SIP server currently serves that terminal (step 153). If the terminal's information is found in the local location table 146 (step 154), the SIP stack program 21 forwards the message to the contact address found from the table (step 157). If the terminal's information is not found in the local location table 146 (step 154), a location DB control function 148 refers to information in the external location DB3 (step 155). If the destination address is online, even if it is served by another SIP server, its contact address shall be stored on the location DB3. Then, as the result of search of the location DB3, if the terminal's contact address is resolved (step 156), the message is forwarded to the contact address (step 157). If the terminal's contact address is not registered on the location DB3 or if the terminal's account (SIP-URI) itself is not found, the SIP stack program 21 returns an error response to the source (step 158). When the address resolver 144 makes a destination domain determination, if it is found that the message is addressed to another domain (step 150), a DNS client 149 sends a query to a DNS server (step 151). Then, if the address is resolved, the SIP stack program 21 forwards the message (step 157); if not, it returns an error response (step 158).

In this flowchart, the explanation is focused on the address resolution procedure and address resolution is directly connected to message forwarding or error response for simplified explanation. However, in actual SIP server operation, the steps for authentication, call status management, specific filtering, etc. may be performed before message forwarding or error response.

Fourth Embodiment

Figure 16:
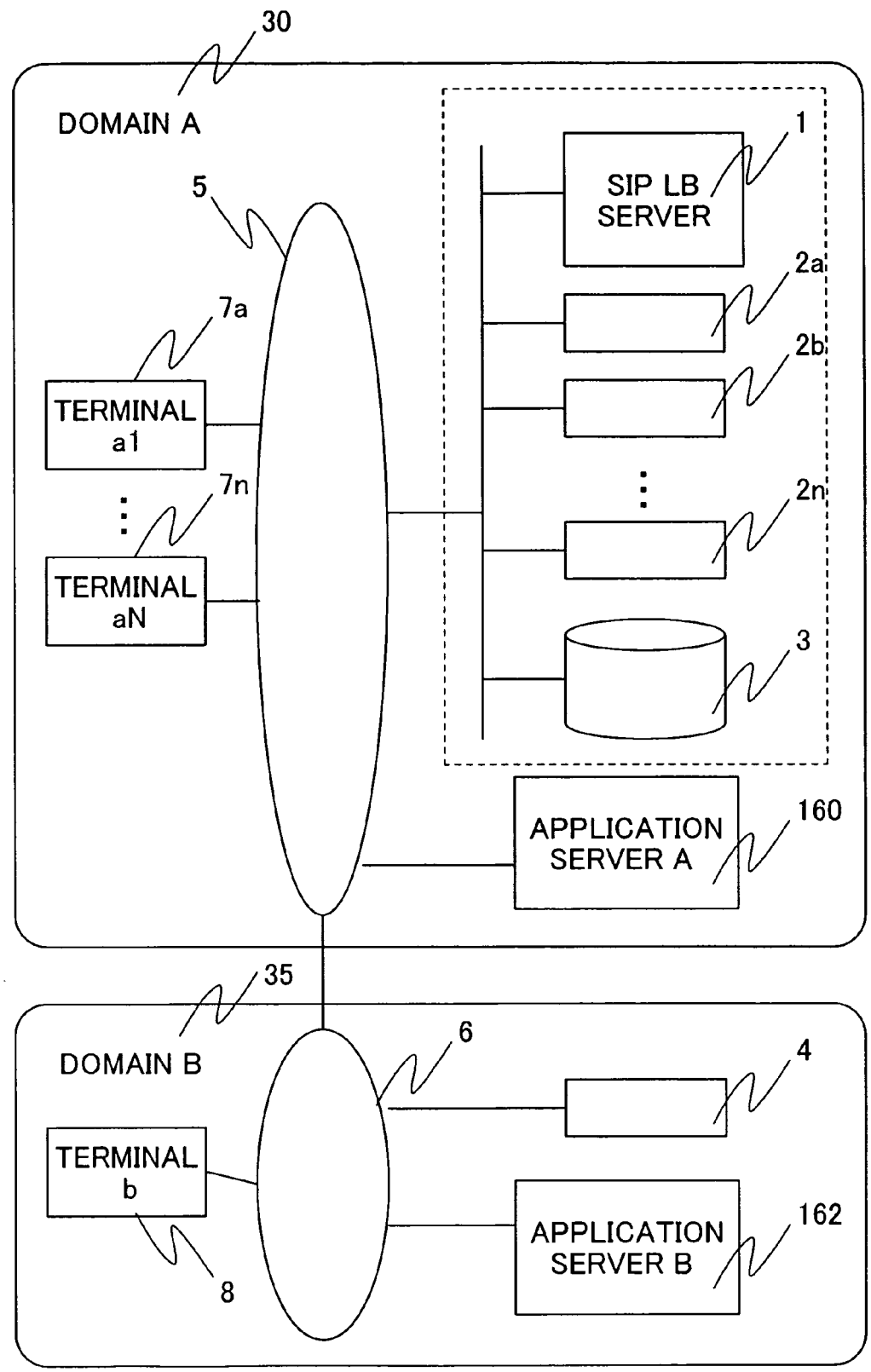
FIG. 16 shows an example of a SIP load balancing system architecture where application servers are used.

FIG. 16 shows an example of a SIP load balancing system architecture where application servers are used. It is conceivable to install application servers such as presence servers and conference servers installed in this way: for example, one application server 160 is installed within a domain A which is the local domain of the SIP LB server 1 and another application server 162 is installed in another domain B. A SIP message originated from the application server 162 installed in another domain B is once sent to a SIP server 4 within the domain to which the application server 162 belongs. If the destination of the message is an terminal belonging to the domain A, the message is sent to the SIP LB server 1 from the SIP server 4. This message sending and receiving procedure is the same as shown in FIG. 11 for the first embodiment. Meanwhile, for the application server 160 installed within the local domain of the SIP LB server 1, it may be regarded as a terminal (end point) and treated like one of the terminals 7 or regarded as a server under the management of another SIP LB server different from the SIP LB server 1 managing the servers 2. In the latter case, a message from the application server 160 is handled as receiving a message via the SIP server 4 in another domain. Depending on whether the application server is regarded as a terminal or a server, the SIP LB server 1 operation differs.

If the application server 160 is treated like one of the terminals 7, the application server 160 is required to operate the same as the terminals 7, as explained for FIG. 3. By treating an application server the same as the terminals, a request originated from the application server can also be handled by load balancing.

On the other hand, if the application server 160 is treated like the SIP server 4 in another domain, the SIP LB server 1 holds a list of the addresses of servers which are interconnected with it and multiple SIP servers 2 under its management and, preferably, the source determination program 22 adds the address of the application server 160 to this address list and manages the list. By treating an application server like a SIP server in another domain, a request originated from an application server without the function of redirection by redirect response can also be handled by load balancing.

In the system architecture diagrams used for the foregoing descriptions, the SIP LB server 1 and multiple SIP server 2 are depicted as separate entities. However, these servers may be integrated into one chassis like a blade server, wherein the servers may operate like server blades constituting the blade server. Moreover, a server module for the application server 160 may be added to the blade server frame and run in the same blade server. By thus integrating servers into a blade server, the servers are supervised and controlled as a unified system. Space saving can be achieved as compared to a configuration where servers are disposed in an array.

By the use of the SIP LB server as illustrated by the described embodiments, if the previous hop source of a received request message is a terminal within the local domain, the SIP LB server determines which SIP server to serve the terminal, based on information in the load balancing management table and notifies the terminal of the address of the serving SIP, using a redirect response. Subsequent communication (including encrypted communication) from the terminal is not routed via the SIP LB server and its load can be assigned to the appropriate SIP server. In particular, because the SIP LB server does not need to intervene in the communication from the terminal after notifying the terminal of the address of the serving SIP server, the number of messages of encrypted communication that must terminate at the SIP LB server when encrypted communication is performed decrease and it can be avoided that the SIP LB server becomes a bottleneck.

If the previous hop source of a received request message is other than a terminal within the local domain, the SIP LB server finds a SIP server to which the destination server connects, referring to the load balancing management table, and forwards the message, as a stateless proxy, to the SIP server. Therefore, similarly, subsequent communication is not routed via the SIP LB server and messages can be assigned to the SIP server having an established session with the terminal.

The communication method of the present invention can implement load balancing across SIP servers even for non-encrypted communication and, therefore, can be applied to even a SIP system where both encrypted communication and non-encrypted communication take place.

What is claimed is:

1. A load balancing system connected to a plurality of terminals within a local domain and terminals and session control servers in one of other domains, said load balancing system comprising:
    a plurality of session control servers; and
    a load balancing server, the load balancing server comprising:
        a transmitting/receiving unit which receives a packet; and
        a control unit which determines a source of the received packet, and
    wherein, upon determining that the source is a terminal or session control server in said one of other domains, the control unit transmits the packet via the transmitting/receiving unit to one session control server of the plurality of session control servers for performing session control that belongs to a same domain as a destination terminal of said packet,
    wherein if the control unit determines the source to be a terminal within said local domain, said control unit determines a session control server that performs session control for the terminal within the local domain out of said plurality of session control servers, and notifies the terminal of the address of the determined session control server via said transmitting/receiving unit,
    wherein if the control unit determines the source to be a terminal within said local domain, said control unit further registers a relation in a location database of the load balancing system between the terminal within the local domain and the session control server that performs session control for the terminal,
    wherein, upon the session control server that performs session control for the terminal receiving a logout notification from the terminal, the session control server instructs said location database to delete the registered relation,
    wherein each session control server of said plurality of session control servers, upon receiving a packet, refers to the location database to determine whether a source of the packet is a terminal for which the session control server that received the packet is responsible for performing session control, and, upon a determination that the source is not a terminal for which the session control server that received the packet is responsible for performing session control, determines to not forward the packet,
    wherein each of said plurality of session control servers further comprises a local location database storing the addresses of each terminal for which the session control server of the plurality of session control servers is responsible for session control, and
    wherein, for each of said plurality of session control servers:

the session control server, upon receiving a packet, determines whether a destination of the packet is a terminal within the local domain, if the session control server determines the destination is a terminal within the local domain, then the session control server searches said local location database and determines whether the destination of the packet is a terminal for which the session control server itself is responsible for session control, if the session control server determines the destination is a terminal for which the session control server itself is responsible for session control, the session control server transmits said packet to the destination, and if the session control server determines the destination is not a terminal for which the session control server itself is responsible for session control, the session control server refers to said location database, searches for an address of a session control server that performs session control for the destination terminal, and forwards said packet to the session control server thus found.

2. The load balancing system according to claim 1,
wherein said load balancing server, if the control unit determines the source of the packet received by the transmitting/receiving unit to be a terminal or session control server in said one of other domains, refers to said location database, searches for and locates the session control server that performs session control for the destination terminal of said received packet within the same domain that the destination terminal belongs, and transmits said received packet via said transmitting/receiving unit to said session control server thus located, and wherein said load balancing server, if the control unit determines the source of the packet received by the transmitting/receiving unit to be a terminal within said local domain, refers to said location database and determines a session control server having a smallest number of terminals served as the session control server that performs session control for said source terminal.

3. The load balancing system according to claim 2,
wherein after said load balancing server determines a session control server that performs session control for the source terminal of said packet, said control unit stores information of weighting according to a communication protocol that the source terminal uses in the location database in association with the registered relation.

4. The load balancing system according to claim 1, wherein said packet is a session control message.

5. The load balancing system according to claim 4, wherein said session control servers are SIP servers and said session control message is a SIP message.

* * * * *